United States Patent
Ceffis et al.

(10) Patent No.: US 11,487,755 B2
(45) Date of Patent: Nov. 1, 2022

(54) PARALLEL QUERY EXECUTION

(71) Applicant: SAP SE, Walldorf (DE)

(72) Inventors: Pierre-Olivier Ceffis, Asnieres sur Seine (FR); Stephane Lecercle, Herblay (FR)

(73) Assignee: SAP SE, Walldorf (DE)

( * ) Notice: Subject to any disclaimer, the term of this patent is extended or adjusted under 35 U.S.C. 154(b) by 895 days.

(21) Appl. No.: 15/178,771

(22) Filed: Jun. 10, 2016

(65) Prior Publication Data
US 2017/0357689 A1    Dec. 14, 2017

(51) Int. Cl.
*G06F 16/2453* (2019.01)
*G06F 16/951* (2019.01)

(52) U.S. Cl.
CPC ...... *G06F 16/24532* (2019.01); *G06F 16/951* (2019.01)

(58) Field of Classification Search
CPC .......................... G06F 16/24532; G06F 16/951
USPC .......................................................... 707/718
See application file for complete search history.

(56) References Cited

U.S. PATENT DOCUMENTS

| | | | | |
|---|---|---|---|---|
| 5,689,313 A * | 11/1997 | Sotheran | ............. | G06F 12/0207 345/536 |
| 6,941,437 B2 * | 9/2005 | Cook | .................... | G06F 9/5016 711/154 |
| 7,051,330 B1 * | 5/2006 | Kaler | .................... | G06F 9/4843 709/203 |
| 7,636,829 B2 * | 12/2009 | Hertzberg | ............... | G06F 9/466 707/999.102 |
| 8,396,959 B2 * | 3/2013 | Telfer | ...................... | H04L 43/00 709/224 |
| 2004/0062267 A1 * | 4/2004 | Minami | .................. | H04L 47/10 370/463 |
| 2009/0019103 A1 * | 1/2009 | Tommaney | ....... | G06F 17/30445 709/201 |
| 2010/0040060 A1 * | 2/2010 | Gleeson | .................. | H04L 45/00 370/392 |
| 2011/0307677 A1 * | 12/2011 | David | .................. | G06F 9/5016 711/163 |

(Continued)

OTHER PUBLICATIONS

Bechhofer, Sean, Ralf Möller, and Peter Crowther. "The DIG description logic interface: DIG/1.1." Proceedings of the 2003 Description Logic Workshop (DL 2003). 2003. (Year: 2003).*

(Continued)

*Primary Examiner* — Mohsen Almani
(74) *Attorney, Agent, or Firm* — Buckley, Maschoff & Talwalkar LLC

(57) ABSTRACT

A system includes reception of a first fragment of a first result set of a first one of a plurality of queries, storage of the first fragment of the first result set in a first local buffer associated with the first one of the plurality of queries, reception of a first fragment of a second result set of a second one of a plurality of queries, storage the first fragment of the second result set in a second local buffer associated with the second one of the plurality of queries, determination to flush the first local buffer, and, in response to the determination, transmit all fragments currently stored in the first local buffer to a client from which the plurality of queries was received with an identifier of the first one of the plurality of queries, before receiving all fragments of the first result set.

20 Claims, 5 Drawing Sheets

(56) References Cited

U.S. PATENT DOCUMENTS

| | | | |
|---|---|---|---|
| 2013/0080413 A1* | 3/2013 | Chen | G06F 16/278 707/706 |
| 2013/0110829 A1* | 5/2013 | Zhou | G06F 16/951 707/728 |
| 2013/0275452 A1* | 10/2013 | Krishnamurthy | G06F 16/24568 707/764 |
| 2015/0112966 A1* | 4/2015 | Tokuda | G06F 16/24549 707/718 |

OTHER PUBLICATIONS

Li, Ming, et al. "Event stream processing with out-of-order data arrival." 27th International Conference on Distributed Computing Systems Workshops (ICDCSW'07). IEEE, 2007. (Year: 2007).*

Zhang, Yang, et al. "ICEDB: Intermittently-connected continuous query processing." 2007 IEEE 23rd International Conference on Data Engineering. IEEE, 2007. (Year: 2007).*

Muller et al., A Highly Integrated Multi-Layer Switch Element Architecture; International Publication No. WO 99/00936; International Application No. PCT/US98/13199; International Filing Date: Jun. 24, 1998; Priority Date: Jun. 30, 1997 (Year: 1997).*

Multiplexer retrieved from https://en.wikipedia.org/wiki/Multiplexer May 17, 2021 (Year: 2021).*

Multiplexer retrieved from https://www.techopedia.com/definition/24124/multiplexer-mux (Year: 2021).*

* cited by examiner

PARALLEL QUERY EXECUTION

BACKGROUND

Enterprise software systems receive, generate, and store data related to many aspects of a business enterprise. Users operate reporting tools to access such data and display the data in appropriate formats. The data may be accessed by submitting a query to a remote query server and receiving a corresponding result set in return.

With the rise of software-as-a-service architectures, some conventional reporting tools are designed to interact with query services available on the cloud as Hypertext Transfer Protocol (HTTP) services. These tools may submit an array of queries to a query service within an HTTP request payload. The query service executes the multiple queries in parallel, buffers the results of each query until all the results of each query are obtained, and returns the buffered results.

DETAILED DESCRIPTION

The following description is provided to enable any person in the art to make and use the described embodiments. Various modifications, however, will remain readily apparent to those in the art.

Figure 1:
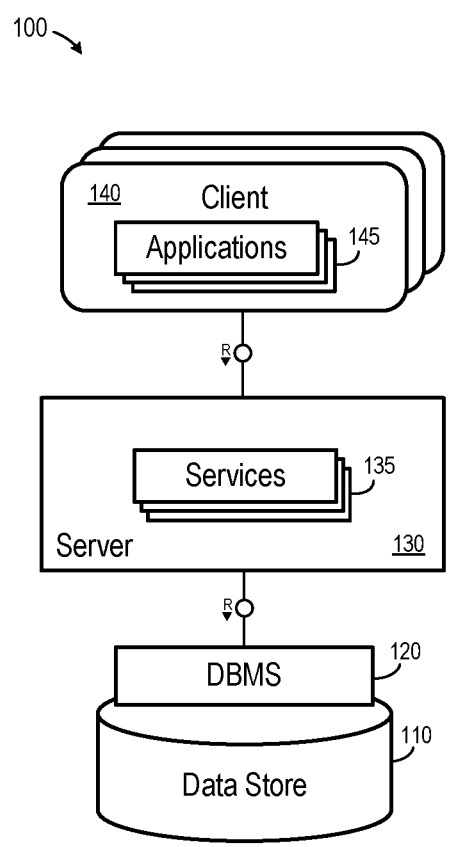
FIG. 1 is a block diagram of a system architecture according to some embodiments.

FIG. 1 is a block diagram of architecture 100 according to some embodiments. Embodiments are not limited to architecture 100 or to a database architecture.

Architecture 100 includes data store 110, database management system (DBMS) 120, server 130, services 135, clients 140 and applications 145. Generally, services 135 executing within server 130 receive requests from applications 145 executing on clients 140 and provides results to applications 145 based on data stored within data store 110.

Server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145, retrieving data from data store 110 based on the requests, processing the data received from data store 110, and providing the processed data to applications 145. For example, one of services 135 may comprise a query service which receives one or more queries from an application 145 within an HTTP request payload. Services 135 may be made available for execution by server 130 via registration and/or other procedures which are known in the art.

In one specific example, a client 140 executes an application 145 to present a user interface to a user on a display of the client 140. The user requests information via the user interface, and the application 145 generates two or more queries based on the requested information. The queries are passed to a query service of services 135 as an array in an HTTP request payload. SQL scripts are generated based on the requests and forwarded for parallel (i.e., at least partially contemporaneous) execution to DBMS 120. DBMS 120 executes the SQL scripts and returns corresponding result sets to the query service 135 based on data of data store 110. Details regarding the return of the result sets to the query service and subsequent processing according to some embodiments are provided below.

Server 130 may provide any suitable protocol interfaces through which applications 145 executing on clients 140 may communicate with services 135 executing on application server 130. For example, server 130 may include a HyperText Transfer Protocol (HTTP) interface supporting a transient request/response protocol over Transmission Control Protocol (TCP), and/or a WebSocket interface supporting non-transient full-duplex communications between server 130 and any clients 140 which implement the WebSocket protocol over a single TCP connection.

One or more services 135 executing on server 130 may communicate with DBMS 120 using database management interfaces such as, but not limited to, Open Database Connectivity (ODBC) and Java Database Connectivity (JDBC) interfaces. These types of services 135 may use Structured Query Language (SQL) to manage and query data stored in data store 110.

DBMS 120 serves requests to query, retrieve, create, modify (update), and/or delete data of data store 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Server 130 may be separated from or closely integrated with DBMS 120. A closely-integrated server 130 may enable execution of services 135 completely on the database platform, without the need for an additional server. For example, according to some embodiments, server 130 provides a comprehensive set of embedded services which provide end-to-end support for Web-based applications. The services may include a lightweight web server, configurable support for Open Data Protocol, server-side JavaScript execution and access to SQL and SQLScript.

Server 130 may provide application services (e.g., via functional libraries) using which services 135 may manage and query the data of data store 110. The application services can be used to expose the database data model, with its tables, views and database procedures, to clients. In addition to exposing the data model, server 130 may host system services such as a search service.

Data store 110 may comprise any query-responsive data source or sources that are or become known, including but not limited to a structured-query language (SQL) relational database management system. Data store 110 may comprise a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each of clients 140 may comprise one or more devices executing program code of an application 145 for presenting user interfaces to allow interaction with server 130. The user interfaces of applications 145 may comprise user interfaces suited for reporting, data analysis, and/or any other functions based on the data of data store 110.

Presentation of a user interface as described herein may comprise any degree or type of rendering, depending on the type of user interface code generated by server 130. For example, a client 140 may execute a Web Browser to request and receive a Web page (e.g., in HTML format) from application server 130 via HTTP, HTTPS, and/or WebSocket, and may render and present the Web page according to known protocols. One or more of clients 140 may also or alternatively present user interfaces by executing a stand-alone executable file (e.g., an .exe file) or code (e.g., a JAVA applet) within a virtual machine. In another method, one of more of clients 140 execute applications 145 loaded from server 130, that receive data and metadata by requests to services 135 executed on the server 130. Data and metadata is processed by the applications 145 to render the user interface on the client 140.

Figure 2:
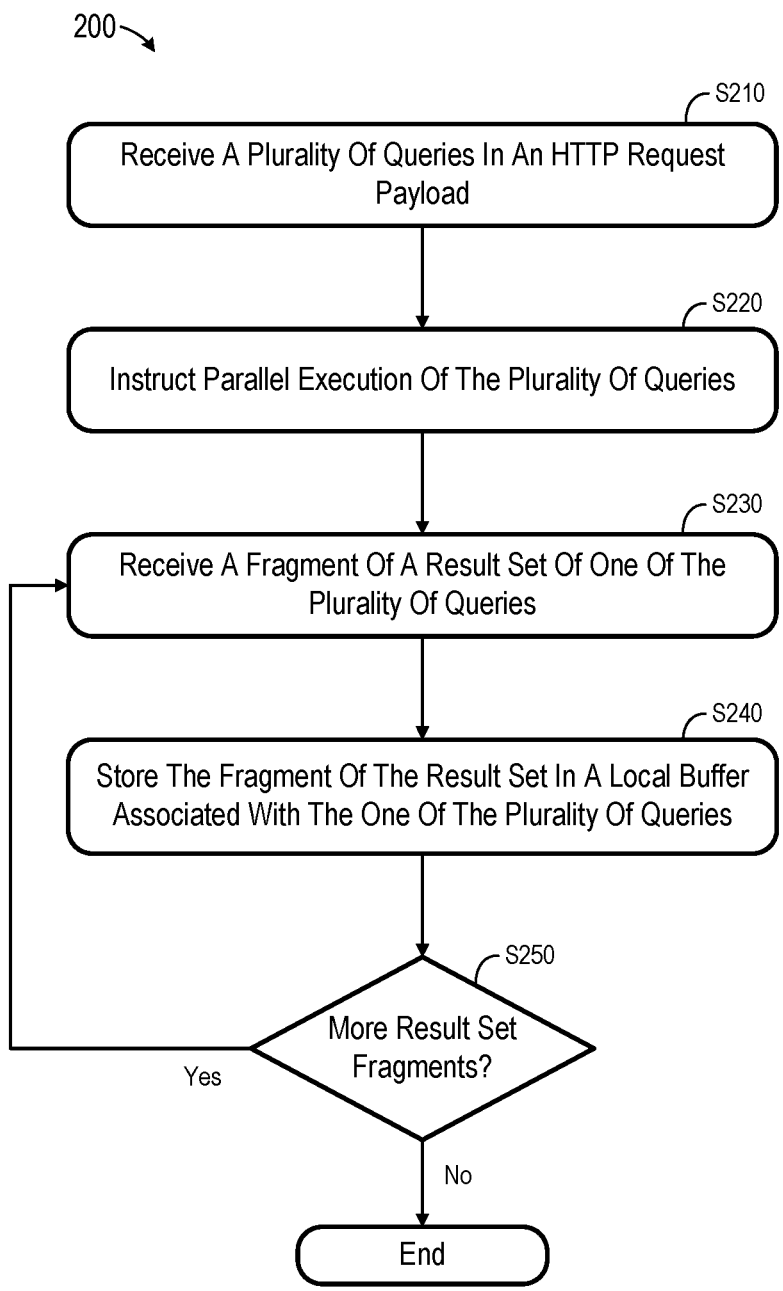
FIG. 2 is a flow diagram of a process according to some embodiments.

FIG. 2 comprises a flow diagram of process 200 according to some embodiments. In some embodiments, various hardware elements of system 100 execute program code to perform process 200. Process 200 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, a plurality of queries are received by a query server. The queries may be received from any source and may conform to any query language or other protocol which is compatible with the query server. According to some embodiments, the queries are Structured Query Language (SQL) queries and are received from an HTTP client within an HTTP request payload.

Figure 3:
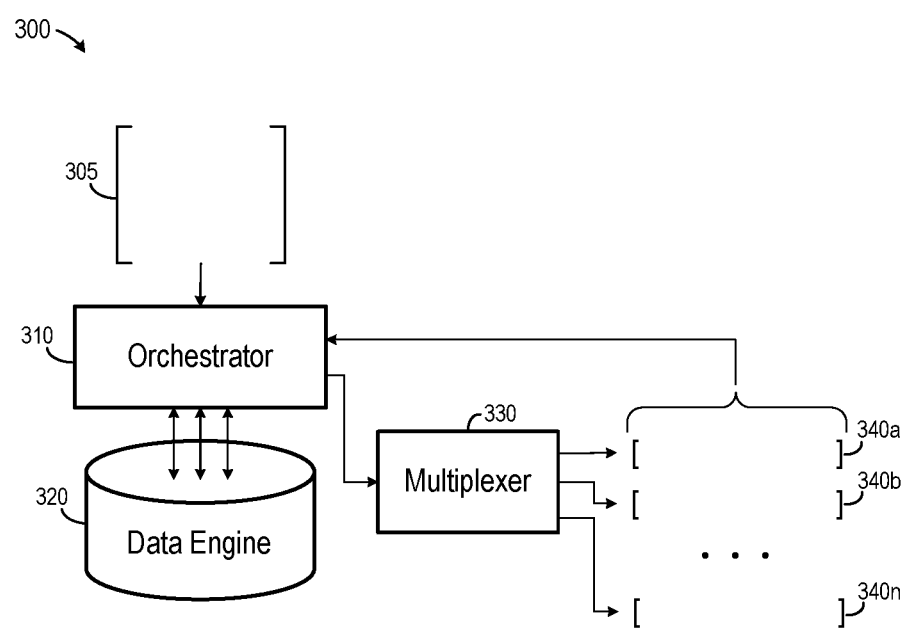
FIG. 3 is a block diagram of a system architecture according to some embodiments.

FIG. 3 is a block diagram of architecture 300 for describing process 200 according to some embodiments. Architecture 300 may comprise an implementation of architecture 100 of FIG. 1 but embodiments are not limited thereto. According to some embodiments, orchestrator 310 receives queries 305 at S210. Orchestrator 310 may comprise a component of a query service as described above. Architecture 300 may be cloud-based such that orchestrator 310 receives queries 305 via HTTP or WebSocket protocols as is known in the art. Orchestrator 310 may assign a single transaction ID to the plurality of queries at S210.

At S220, parallel execution of the plurality of queries is instructed. For example, orchestrator 310 may forward each query to data engine 320 for execution. Data engine 320 may comprise an implementation of DBMS 120 and data store 110 of architecture 100. The queries may be formulated simultaneously and/or sequentially. Orchestrator 310 may transform the queries to another query language and/or to an execution script prior to instructing execution thereof at S220. In response to S220, data engine 320 begins execution of the queries and generation of a result set associated with each query.

A first fragment of a result set of one of the plurality of queries is received at S230. That is, data engine 320 is configured to return partial result sets (i.e., fragments) as they are generated to orchestrator 310. As described above, these fragments are conventionally buffered by a query server until all result sets have been generated, and then all of the result sets are transmitted to the client.

In the present case, however, the first fragment of the result set is stored in a local buffer at S240. The local buffer is associated with the query to whose result set the fragment belongs. FIG. 3 illustrates multiplexer 330 and local buffers 340a through 340n according to some embodiments. According to one example of S240, orchestrator 310 may pass the received fragment to multiplexer 330 along with an indicator of the query to whose result set the fragment belongs (e.g., a query ID). In response, multiplexer 330 requests allocation of a local buffer to associate with the query and stores the fragment in the allocated local buffer.

Next, at S250, it is determined whether additional result set fragments are being received. In order to make this determination, data engine 320 may provide an end flag or other indication to orchestrator 310 when transmitting a last fragment of a result set, and orchestrator 310 may maintain a record of whether a last result set fragment has been received for each of the plurality of queries. Flow returns to S230 from S250 if a last result set fragment has not yet been received for at least one of the plurality of queries.

A next fragment of a result set of one of the plurality of queries is received at S230. That is, data engine 320 is configured to return partial result sets (i.e., fragments) as they are generated to orchestrator 310. As described above, these fragments are conventionally buffered by a query server until all result sets have been generated, and then all of the result sets are transmitted to the client.

The fragment of the result set is stored in a local buffer associated with its query at S240. As described above, orchestrator 310 may pass the received fragment to multiplexer 330 along with an indicator of the query to whose result set the fragment belongs (e.g., a query ID). If a local buffer associated with the query has already been allocated, multiplexer 330 may simply append the fragment to any existing fragments in the allocated local buffer at S240. According to some embodiments, each fragment is associated with a sequence number or other index so that a result set may be reconstructed from the stored fragments, even if the fragments are not returned or received in sequence.

Flow continues as described above to store fragments in corresponding local buffers (and to allocate local buffers, if needed) until it is determined at S250 that all fragments of all result sets have been received.

Figure 4:
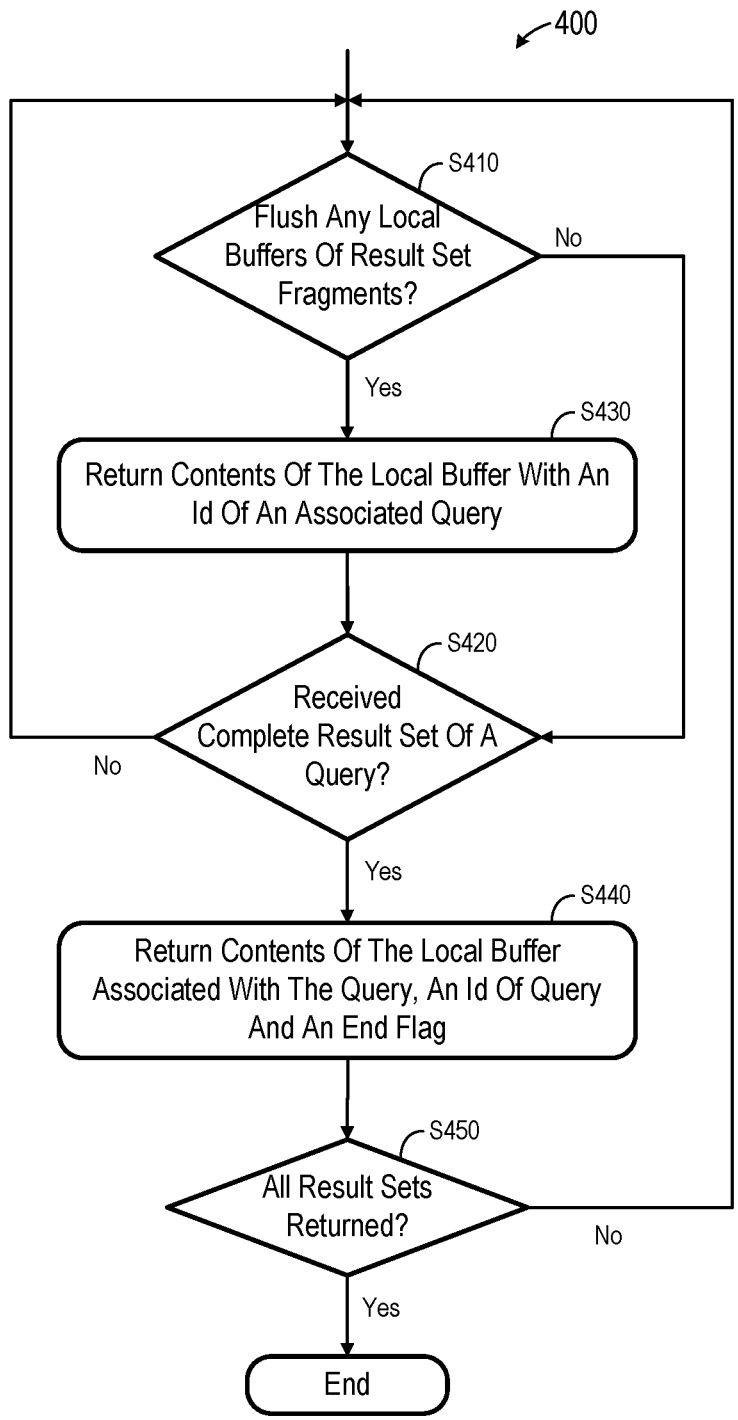
FIG. 4 is a flow diagram of a process according to some embodiments.

According to some embodiments, process 400 of FIG. 4 executes contemporaneously with process 200. Process 400 may operate to occasionally transmit the contents of the local buffers to the client, allowing the local buffers to be overwritten with newly-received fragments. Some embodiments may therefore conserve server memory. Some embodiments may also or alternatively allow a client to operate on one of the result sets or fragments thereof before all of the result sets are received by the client. All fragments currently stored in a first local buffer may be transmitted to a client from which the plurality of queries was received with an identifier of the first one of the plurality of queries, before all fragments of the first result set are received.

More particularly, it is determined at S410 whether any local buffers should be flushed. For example, orchestrator 310 may determine whether any local buffers are nearing capacity, which may include a determination of a current storage capacity of each local buffer. The determination at S410 may be based on a minimum threshold amount of available memory, a minimum threshold percentage of available memory, an expected fragment size, and/or any other suitable metric.

If the determination at S410 is negative, flow proceeds to S420 to determine if any complete result sets have been received. As mentioned above, orchestrator 310 may keep track of those queries for which complete result sets have been received from data engine 320. Flow returns to S410 if it is determined at S420 that no complete result sets have been received. Accordingly, flow cycles between S410 and S420 until it is determined that a local buffer should be flushed or that a complete result set has been received. It should be noted that, during such cycling, fragments may be being stored in the local buffers pursuant to process 200.

Accordingly, it is eventually determined at S410 that a local buffer should be flushed. Flow proceeds to S430 in response to this determination. At S430, contents of the local buffer to be flushed are returned to the querying client, along with an identifier of the associated query. The contents may be returned via orchestrator 310 as illustrated in FIG. 3, and the identifier may comprise metadata identifying the query.

Each fragment may include the identifier and/or the entire contents may be tagged with the identifier. As mentioned above, each fragment may also include a sequence number. According to some embodiments, the returned contents are also accompanied by a transaction ID identifying the transaction associated with the request received at S210.

The entire local buffer is now free to receive (i.e., during S230 of process 200) new result set fragments of the query with which the result is associated. Flow continues to cycle between S410 and S420 until it is determined that a local buffer should be flushed or that a complete result set has been received.

Upon determining at S420 that a complete result set has been received for a given query, the contents of the associated local buffer is returned to the client at S440. Also returned are an identifier of the query and an end flag. The end flag may allow some clients (e.g., using the Websocket protocol) to begin processing the result set of the identified query before receiving the complete result sets of others of the plurality of queries. The associated local buffer may be de-allocated at S440.

At S450, it is determined whether the result sets of all of the plurality of queries have been returned to the client. If not, flow returns to S410 and continues as described above. If so, flow terminates.

Figure 5:
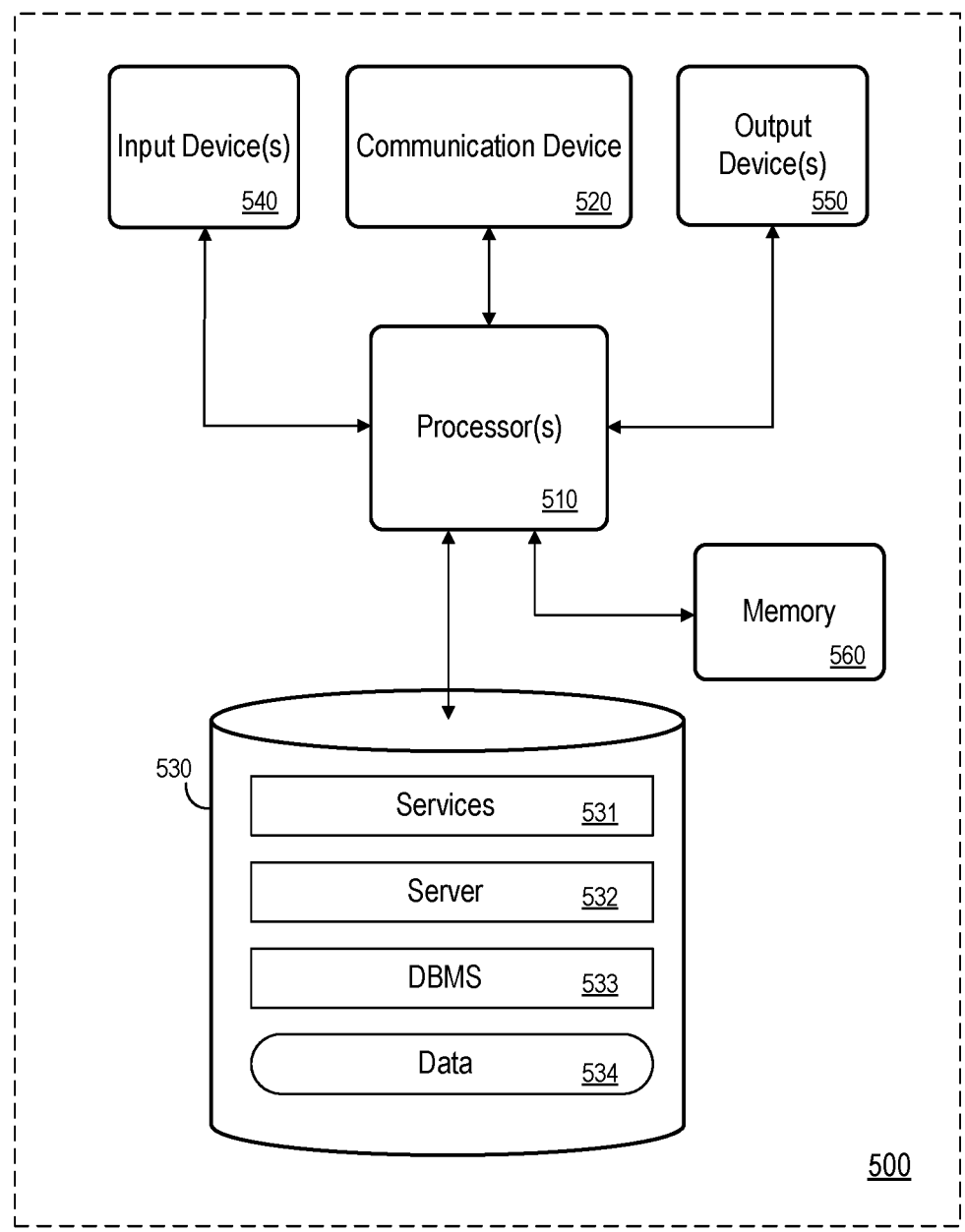
FIG. 5 is a block diagram of an apparatus according to some embodiments.

FIG. 5 is a block diagram of apparatus 500 according to some embodiments. Apparatus 500 may comprise a general-purpose computing apparatus and may execute program code to perform any of the functions described herein. Apparatus 500 may comprise an implementation of server 130, DBMS 120 and data store 110 of FIG. 1 and/or of architecture 300 of FIG. 3 in some embodiments. Apparatus 500 may include other unshown elements according to some embodiments.

Apparatus 500 includes processor 510 operatively coupled to communication device 520, data storage device 530, one or more input devices 540, one or more output devices 550 and memory 560. Communication device 520 may facilitate communication with external devices, such as a reporting client, or a data storage device. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to enter information into apparatus 500. Output device(s) 550 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 560 may comprise Random Access Memory (RAM), Storage Class Memory (SCM) or any other fast-access memory. Memory 560 may include local buffers operating as described herein.

Services 531, server 532 and DBMS 533 may comprise program code executed by processor 510 to cause apparatus 500 to perform any one or more of the processes described herein. Embodiments are not limited to execution of these processes by a single apparatus. Data 534 (either cached or a full database) may be stored in volatile memory such as memory 560. Data storage device 530 may also store data and other program code for providing additional functionality and/or which are necessary for operation of apparatus 500, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
    a memory storing processor-executable process steps; and a processor to execute the processor-executable process steps to cause the system to:
receive a first fragment of a plurality of fragments of a first result set of a first one of a plurality of queries received from a client, wherein each fragment is associated with a sequence number that defines a reconstruction order for the plurality of fragments in the first result set;
receive at a local buffer element, with the first fragment, a query identifier that indicates the first fragment belongs with the first result set;
receive from the local buffer element, in response to receipt of the first fragment, a request to allocate a first local buffer for the first one of the plurality of queries, wherein each query of the plurality of queries is associated with a distinct local buffer of a plurality of local buffers after allocation of the query to the distinct local buffer;
determine whether the first local buffer has been allocated to the first one of the plurality of queries based on the query identifier;
allocate, in response to the received request for allocation of the first local buffer, the first local buffer for the first one of the plurality of queries in a case that it is determined the first local buffer has not been allocated to the first one of the plurality of queries;
store the first fragment of the first result set in the first local buffer allocated to the first one of the plurality of queries;
receive a first fragment of a second result set of a second one of the plurality of queries;
store the first fragment of the second result set in a second local buffer allocated to the second one of the plurality of queries, wherein the first local buffer is different from the second local buffer;
determine to flush the first local buffer prior to receipt of all of the fragments of the first result set in the first local buffer;
in response to the determination, transmit all fragments currently stored in the first local buffer to the client from which the plurality of queries was received with the query identifier and the sequence numbers, before receiving all fragments of the first result set;
de-allocating the first local buffer in a case that all fragments of the first result set are transmitted to the client; and
reconstructing at the client the first result set based on the sequence number wherein the fragments are not received in a sequence of the sequence numbers.

2. A system according to claim 1, the processor to further execute the processor-executable process steps to cause the system to:
determine to flush the second local buffer; and
in response to the determination, transmit all fragments currently stored in the second local buffer to the client with an identifier of the second one of the plurality of queries, before receiving all fragments of the second result set.

3. A system according to claim 1, the processor to further execute the processor-executable process steps to cause the system to:
receive a second fragment of the first result set of the first one of the plurality of queries; and
store the second fragment of the first result set in the first local buffer.

4. A system according to claim 3, the processor to further execute the processor-executable process steps to cause the system to:
determine that all fragments of the first result set have been received; and
transmit all fragments currently stored in the first local buffer to the client with an identifier of the first one of the plurality of queries and an end flag.

5. A system according to claim 1, the processor to further execute the processor-executable process steps to cause the system to:
receive the plurality of queries from the client; and
instruct a data engine to execute the plurality of queries at least partially contemporaneously.

6. A system according to claim 5,
wherein reception of the plurality of queries comprises reception of the plurality of queries in a Hypertext Transfer Protocol request payload.

7. A system according to claim 1, wherein determination to flush the first local buffer comprises:
determination of a current storage capacity of the first local buffer.

8. A computer-implemented method comprising:
receiving a plurality of database queries from a client;
instructing a data engine to execute the plurality of database queries at least partially contemporaneously;
receiving a first fragment of a plurality of fragments of a first result set of a first one of the plurality of database queries from the data engine, wherein each fragment is associated with a sequence number that defines a reconstruction order for the plurality of fragments in the first result set;
receiving at a local buffer element, with the first fragment, a query identifier that indicates the first fragment belongs with the first result set;
receiving from the local buffer element, in response to receipt of the first fragment, a request to allocate a first local buffer for the first one of the plurality of queries, wherein each query of the plurality of queries is associated with a distinct local buffer of a plurality of local buffers after allocation of the query to the distinct local buffer;
determining whether the first local buffer has been allocated to the first one of the plurality of queries based on the query identifier;
allocating, in response to the received request for allocation of the first local buffer, the first local buffer for the first one of the plurality of queries in a case that it is determined the first local buffer has not been allocated to the first one of the plurality of queries;
storing the first fragment of the first result set in the first memory buffer allocated to the first one of the plurality of queries;
receiving a first fragment of a second result set of a second one of the plurality of queries from the data engine;
storing the first fragment of the second result set in a second memory buffer allocated to the second one of the plurality of queries, wherein the first memory buffer is different from the second memory buffer;
determining to flush the first memory buffer prior to receipt of all of the fragments of the first result set in the first local buffer;
in response to the determination, transmitting all fragments currently stored in the first memory buffer to the client with the query identifier and the sequence numbers before receiving all fragments of the first result set;

de-allocating the first local buffer in a case that all fragments of the first result set are transmitted to the client; and reconstructing at the client the first result set based on the sequence number wherein the fragments are not received in a sequence of the sequence numbers.

9. A method according to claim 8, further comprising:
determining to flush the second memory buffer; and
in response to the determination, transmitting all fragments currently stored in the second memory buffer to the client with an identifier of the second one of the plurality of queries, before receiving all fragments of the second result set.

10. A method according to claim 8, further comprising:
receiving a second fragment of the first result set of a first one of the plurality of database queries; and
storing the second fragment of the first result set in the first memory buffer.

11. A method according to claim 10, further comprising:
determining that all fragments of the first result set have been received; and
transmitting all fragments currently stored in the first memory buffer to the client with an identifier of the first one of the plurality of queries and an end flag.

12. A method according to claim 8,
wherein receiving the plurality of queries comprises receiving the plurality of queries in a Hypertext Transfer Protocol request payload.

13. A method according to claim 8, wherein determining to flush the first memory buffer comprises:
determining a current storage capacity of the first memory buffer and an expected fragment size.

14. A non-transitory computer-readable medium storing program code, the program code executable by a processor of a computing system to cause the computing system to:
receive a first fragment of a plurality of fragments of a first result set of a first one of a plurality of queries received from a client, wherein each fragment is associated with a sequence number that defines a reconstruction order for the plurality of fragments in the first result set;
receive at a local buffer element, with the first fragment, a query identifier that indicates the first fragment belongs with the first result set;
receive from the local buffer element, in response to receipt of the first fragment, a request to allocate a first local buffer for the first one of the plurality of queries, wherein each query of the plurality of queries is associated with a distinct local buffer of a plurality of local buffers after allocation of the query to the distinct local buffer;
determine whether the first local buffer has been allocated to the first one of the plurality of queries based on the query identifier;
allocate, in response to the received request for allocation of the first local buffer, the first local buffer for the first one of the plurality of queries in a case that it is determined the first local buffer has not been allocated to the first one of the plurality of queries;
store the first fragment of the first result set in the first local buffer allocated to the first one of the plurality of queries;

receive a first fragment of a second result set of a second one of the plurality of queries;
store the first fragment of the second result set in a second local buffer allocated to the second one of the plurality of queries, wherein the first local buffer is different from the second local buffer;
determine to flush the first local buffer prior to receipt of all of the fragments of the first result set in the first local buffer;
in response to the determination, transmit all fragments currently stored in the first local buffer to the client from which the plurality of queries was received with the query identifier and the sequence numbers before receiving all fragments of the first result set;
de-allocating the first local buffer in a case that all fragments of the first result set are transmitted to the client; and
reconstruct at the client the first result set based on the sequence number wherein the fragments are not received in a sequence of the sequence numbers.

15. A medium according to claim 14, the program code executable by a processor of a computing system to cause the computing system to:
determine to flush the second local buffer; and
in response to the determination, transmit all fragments currently stored in the second local buffer to the client with an identifier of the second one of the plurality of queries, before receiving all fragments of the second result set.

16. A medium according to claim 14, the program code executable by a processor of a computing system to cause the computing system to:
receive a second fragment of the first result set of the first one of the plurality of queries; and
store the second fragment of the first result set in the first local buffer.

17. A medium according to claim 16, the program code executable by a processor of a computing system to cause the computing system to:
determine that all fragments of the first result set have been received; and
transmit all fragments currently stored in the first local buffer to the client with an identifier of the first one of the plurality of queries and an end flag.

18. A medium according to claim 14, the program code executable by a processor of a computing system to cause the computing system to:
receive the plurality of queries from the client; and
instruct a data engine to execute the plurality of queries at least partially contemporaneously.

19. A medium according to claim 18,
wherein reception of the plurality of queries comprises reception of the plurality of queries in a Hypertext Transfer Protocol request payload.

20. A medium according to claim 14, wherein determination to flush the first local buffer comprises:
determination of a current storage capacity of the first local buffer.

* * * * *